(12) United States Patent
Gao et al.

(10) Patent No.: US 9,588,620 B2
(45) Date of Patent: Mar. 7, 2017

(54) METHOD AND DEVICE FOR DISPLAYING CHARACTER ON TOUCHSCREEN

(71) Applicant: ZTE CORPORATION, Shenzhen, Guangdong Province (CN)

(72) Inventors: Minggang Gao, Shenzhen (CN); Qingyu Ni, Shenzhen (CN); Zhuo Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 45 days.

(21) Appl. No.: 14/422,337

(22) PCT Filed: Jul. 22, 2013

(86) PCT No.: PCT/CN2013/079818
§ 371 (c)(1),
(2) Date: Feb. 18, 2015

(87) PCT Pub. No.: WO2013/178156
PCT Pub. Date: Dec. 5, 2013

(65) Prior Publication Data
US 2015/0193077 A1    Jul. 9, 2015

(30) Foreign Application Priority Data

Aug. 30, 2012 (CN) .......................... 2012 1 0312942

(51) Int. Cl.
*G06F 3/0482* (2013.01)
*G06F 3/041* (2006.01)
(Continued)

(52) U.S. Cl.
CPC .......... *G06F 3/0418* (2013.01); *G06F 3/0412* (2013.01); *G06F 3/0482* (2013.01);
(Continued)

(58) Field of Classification Search
CPC ........... G06F 2203/041; G06F 3/03547; G06F 3/041; G06F 3/0412; G06F 3/0414;
(Continued)

(56) References Cited

U.S. PATENT DOCUMENTS

2006/0053387 A1* 3/2006 Ording ................ G06F 3/04883
715/773
2006/0161846 A1* 7/2006 Van Leeuwen ..... G06F 3/04842
715/702
(Continued)

FOREIGN PATENT DOCUMENTS

CN      101299177 A    11/2008
CN      102073454 A    5/2011

OTHER PUBLICATIONS

Extended European Search Report from European Patent Appl. No. 13796634.7 1507, dated Jul. 13, 2015.
(Continued)

*Primary Examiner* — Premal Patel
(74) *Attorney, Agent, or Firm* — Koppel, Patrick, Keybl & Philpott

(57) ABSTRACT

Disclosed are a method and device for displaying a character on a touchscreen. The method comprises: when it is detected that a time period during which the user touches an area, where a character is displayed, on the touchscreen exceeds a preset time threshold, a shaded area formed when the user touches the touchscreen is determined; at least one shaded character in the shaded area is acquired, and independently displayed and enlarged on a preset enlargement area excluding the shaded area on the touchscreen; and the touch of the user on the preset enlargement area is detected, and locating and selecting is performed on the at least one character in the shaded area according to the detected touch.

8 Claims, 7 Drawing Sheets

(51) Int. Cl.
   *G06F 3/0488*   (2013.01)
   *G06F 3/0481*   (2013.01)
   *G06F 3/0484*   (2013.01)
(52) U.S. Cl.
   CPC ...... *G06F 3/04812* (2013.01); *G06F 3/04842* (2013.01); *G06F 3/04883* (2013.01); *G06F 3/04886* (2013.01); *G06F 2203/04101* (2013.01); *G06F 2203/04808* (2013.01)
(58) Field of Classification Search
   CPC ...... G06F 3/0416; G06F 3/0418; G06F 3/046; G06F 3/047; H05K 9/0073; H05K 9/0079; H05K 9/0081; H05K 9/0088
   See application file for complete search history.

(56) References Cited

U.S. PATENT DOCUMENTS

| | | | |
|---|---|---|---|
| 2006/0209016 A1 | 9/2006 | Fox et al. | |
| 2007/0260981 A1 | 11/2007 | Kim et al. | |
| 2008/0291171 A1* | 11/2008 | Shin | G06F 3/0481 345/168 |
| 2009/0109182 A1 | 4/2009 | Fyke et al. | |
| 2011/0205248 A1 | 8/2011 | Honda et al. | |

OTHER PUBLICATIONS

International Search Report (Form PCT/ISA/210) for PCT/CN2013/079818 mailed Oct. 31, 2013.

* cited by examiner

METHOD AND DEVICE FOR DISPLAYING CHARACTER ON TOUCHSCREEN

TECHNICAL FIELD

The disclosure relates to the field of mobile communication, and especially to a method and a device for displaying a character on a touchscreen.

BACKGROUND

In the related art, with the rise of the Smartphone and other smart products, a touch screen input mode has become increasingly popular. Touchscreen input facilitates the use of people; meanwhile, more use inconvenience also exists. For example: touchscreen has no tactile impression as a keyboard machine, which makes a user usually touching a plurality of keys on a screen, and results in unnecessary inputs.

Moreover, when characters are selected, since under normal circumstances, the font is much smaller than a finger area, then one finger will cover several characters, and part of the contents to be selected by the user and a starting position of the characters cannot be located accurately. Generally, it needs to press a plurality of times repeatedly so as to locate the character successfully, such that, great inconvenience is brought to the use of users.

SUMMARY

Provided by the disclosure is a method and device for displaying a character on a touchscreen, so as to solve the problem in the related art that characters cannot be located and selected accurately when performing touchscreen input on the terminal.

Provided by the disclosure is a method for displaying a character on a touchscreen, the method comprising:

when it is detected that a time period during which the user touches an area, where at least one character is displayed, on the touchscreen exceeds a preset time threshold, determining a shaded area formed when the user touches the touchscreen;

acquiring at least one shaded character in the shaded area, and independently displaying and enlarging the at least one shaded character on a preset enlargement area excluding the shaded area on the touchscreen;

and detecting a touch of the user on the preset enlargement area, and performing locating and/or selecting on the at least one shaded character in the shaded area according to the detected touch.

Also provided by the disclosure is a device for displaying a character on a touchscreen, comprising:

a detection and determination component configured to, when it is detected that a time period during which the user touches an area, where at least one character is displayed, on the touchscreen exceeds a preset time threshold, determine a shaded area formed when the user touches the touchscreen;

a displaying and enlarging component configured to acquire at least one shaded character in the shaded area, and independently display and enlarge the at least one character on a preset enlargement area excluding the shaded area on the touchscreen;

and a character processing component configured to detect a touch of the user on the preset enlargement area, and perform locating and selecting on the at least one shaded character in the shaded area according to the detected touch.

The beneficial effects of the disclosure are as follows:

By independently displaying and enlarging the shaded character, which is in the shaded area, in a preset enlargement area on the touchscreen and performing locating or selecting on the shaded character by detecting the operation of the user on the preset enlargement area, the problem in related art that characters cannot be located and selected accurately when performing touchscreen input on the terminal is solved, and the success rate can be improved when a user selects and locates a character, thereby breaking the bottleneck of the accuracy of a smart phone for locating and selecting a character.

The above-mentioned description is only a summary of the technical solutions of the disclosure, and in order to understand the technical means of the disclosure more clearly, the technical means can be implemented according to the contents of the specification; in addition, in order to make the above-mentioned and other purposes, features and advantages more obvious and understandable, the specific implementations of the disclosure are particularly illustrated.

BRIEF DESCRIPTION OF THE DRAWINGS

By reading the detailed description of the preferred implementations hereinafter, a variety of other advantages and benefits become clear to a person skilled in the art. Drawings are only used to illustrate the preferred implementations, but are not considered as limiting the disclosure. In addition, throughout the drawings, the same reference signs indicates the same components, wherein.

DETAILED DESCRIPTION OF EMBODIMENTS

Figure 1:
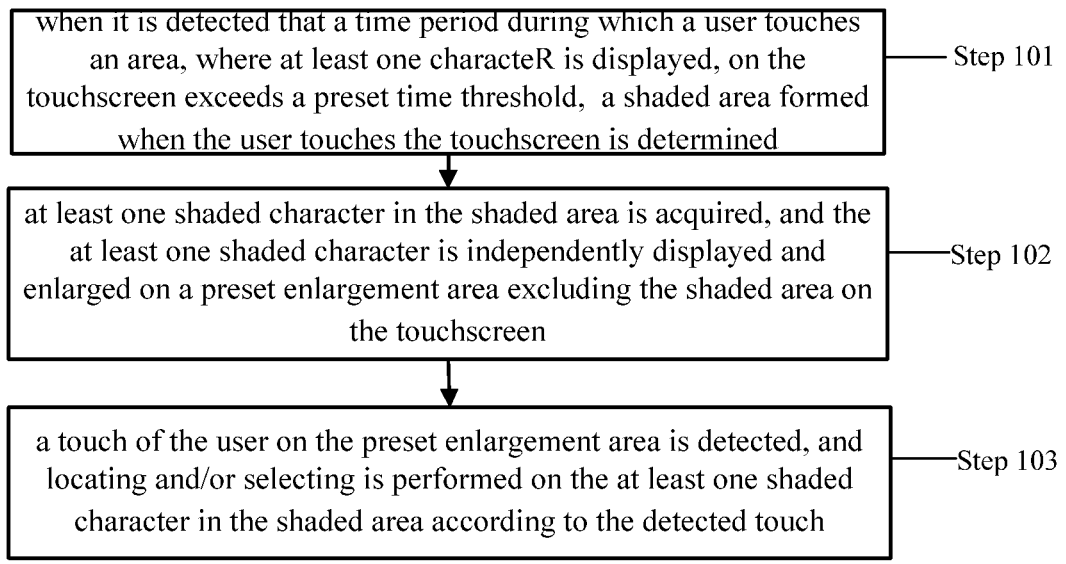
FIG. 1 is a flowchart of a method for displaying a character on a touchscreen according to an embodiment of the disclosure.

Exemplary embodiments of the disclosure will be described in more detail below with reference to the accompanying drawings. Although the exemplary embodiments of the disclosure are displayed in the drawings, it should be understood that the disclosure can be realized in various forms and should not be limited to the embodiments set forth herein. Inversely, providing these embodiments is for understanding the disclosure more thorough and integrally conveying the range of the disclosure to a person skilled in the art.

In order to solve the problem in related art that characters are located and selected inaccurately when performing touchscreen input on the terminal, embodiments of the disclosure provide a method and device for displaying a character on a touchscreen; and the embodiments of the disclosure provide a solution for locating characters and inputting characters according to a usage habit and a finger area of a user, and the performance in this aspect will be greatly improved. The disclosure is further described in details in combination with the drawings and embodiments below. It should be understood that specific embodiments described here are only used to explain the disclosure and not intended to limit the disclosure.

Method Embodiments

According to an embodiment of the disclosure, a method for displaying a character on a touchscreen is provided; FIG. 1 is a flowchart of a method for displaying a character on a touchscreen according to an embodiment of the disclosure; and as shown in FIG. 1, the method for displaying the character on the touchscreen according to the embodiment of the disclosure comprises the following steps.

Step 101, when it is detected that a time period during which a user touches an area, where at least one character is displayed, on the touchscreen exceeds a preset time threshold, a shaded area formed when the user touches the touchscreen is determined.

When it is detected that the time period during which the user touches an area, where no character is displayed, on the touchscreen exceeds the preset time threshold, or when it is detected that the time period during which the user touches the touchscreen does not exceed the preset time threshold, an operation of the user is not responded.

In step 101, determining the shaded area formed when the user touches the touchscreen comprises:

the radius $R_r$ of the shaded area is determined according to formula 1:

$$R_r = R_t + d_r \quad \text{formula 1;}$$

where $R_t$ is the maximum radius of an area which is actually touched and pressed by the user and is detected by the touchscreen, and $d_r$ is a preset predicted value; and the shaded area is determined according to the radius $R_r$.

Step 102, at least one shaded character in the shaded area is acquired, and the at least one shaded character is independently displayed and enlarged on a preset enlargement area excluding the shaded area on the touchscreen.

In step 102, a coordinate system where the whole touchscreen display area locates is an XOY coordinate system, and the coordinate system where the preset enlargement area locates is an X'O'Y' coordinate system, wherein a coordinate value of O' point in the XOY coordinate system is $(X_0, Y_0)$; in the XOY coordinate system, the display area of the whole touchscreen display area is D1 area, the shaded area in the D1 area is D3 area, and a rectangle taking the D3 area as the inscribed circle is D2 area; and in the X'O'Y' coordinate system, the preset enlargement area is D4 area.

Step 102 specifically comprises:

the D3 area is detected, the D2 area is determined according to the D3 area, and a length a and a width b of the D2 area are acquired;

preset screen extension ratios M and N are acquired, where M=a'/a, N=b'/b, a' is the length of the D4 area, and b' is the width of the D4 area;

a transition relation between a point (x, y) in the D2 area in the XOY coordinate system and a point (x', y') in the D4 area in the X'O'Y' coordinate system according to formula 2 and formula 3;

$$x' = (x - x_0) * M \quad \text{formula 2;}$$

$$y' = (y - y_0) * N \quad \text{formula 3;}$$

the D4 area is determined according to the transition relation; and the at least one shaded character in the shaded area is acquired and displayed in the D4 area, wherein the font size of the D4 area is set as T times of an original character size, where T=min (M, N).

Step 103, a touch of the user on the preset enlargement area is detected, and locating and/or selecting is performed on the at least one shaded character in the shaded area according to the detected touch.

Specifically, step 103 comprises the following processing: when it is detected that the user touches the preset enlargement area, a starting position of the preset enlargement area touched by the user is recorded and it is detected whether the user continuously performs slide touch on the preset enlargement area; if no, a corresponding starting position of the shaded area is calculated according to the starting position of the preset enlargement area and a cursor is moved to the front of a character corresponding to the starting position of the shaded area, wherein the starting position of the shaded area is in the shaded area; and if yes, an ending position of the preset enlargement area touched by the user is recorded and a corresponding starting position of the shaded area and ending position of the shaded area, which are in the shaded area, are calculated according to the starting position of the preset enlargement area and the ending position of the preset enlargement area, and corresponding characters between the starting position of the shaded area and the ending position of the shaded area are selected.

In step 103, calculating the corresponding starting position of the shaded area in the occlusion area according to the starting position of the preset enlargement area and moving the cursor to the front of a character corresponding to the starting position of the occlusion area specifically comprise:

a centre coordinate $(x_c', y_c')$ of the starting position in the D4 area touched by the user is acquired, and an original coordinate $(x_c, y_c)$ corresponding to the centre coordinate $(x_c', y_c')$ in the shaded area is calculated according to formula 4 and formula 5:

$$x_c = x_c'/M + x_0 \quad \text{formula 4;}$$

$$y_c = y_c'/N + y_0 \quad \text{formula 5;}$$

the cursor is set between two characters which are closest to the original coordinate $(x_c, y_c)$.

In step 103, recording the ending position of the preset enlargement area touched by the user and calculating corresponding starting position of the shaded area and ending position of the shaded area in the shaded area according to the starting position of the preset enlargement area and the ending position of the preset enlargement area, and selecting corresponding characters between the starting position of the shaded area and the ending position of the shaded area specifically comprises:

a centre coordinate $(x_{c1}', y_{c1}')$ of a starting position of the D4 area touched by the user is acquired, and an original coordinate $(x_{c1}, y_{c1})$ corresponding to the centre coordinate $(x_{c1}', y_{c1}')$ in the shaded area is calculated according to formula 6 and formula 7:

$$x_{c1} = x_{c1}'/M + x_0 \quad \text{formula 6;}$$

$$y_{c1} = y_{c1}'/N + y_0 \quad \text{formula 7;}$$

the starting cursor is set between two characters which are closest to the original coordinate $(x_{c1}, y_{c1})$;

after it is detected that the sliding of the user in the D4 area ends, a centre coordinate $(x_{c2}', y_{c2}')$ of an ending position in the D4 area touched by the user is acquired, and an original coordinate $(x_{c2}, y_{c2})$ corresponding to the centre coordinate $(x_{c2}', y_{c2}')$ in the shaded area is calculated according to formula 8 and formula 9:

$$x_{c2} = x_{c2}'/M + x_0 \quad \text{formula 8;}$$

$$y_{c2} = y_{c2}'/N + y_0 \quad \text{formula 9;}$$

the ending cursor is set between two characters which are closest to the original coordinate $(x_{c2}, y_{c2})$; and characters between the starting cursor and the ending cursor in the XOY coordinate system are selected.

The technical solutions of the embodiment of the disclosure will be described in detail in combination with the accompanying drawings hereinafter.

Figure 2:
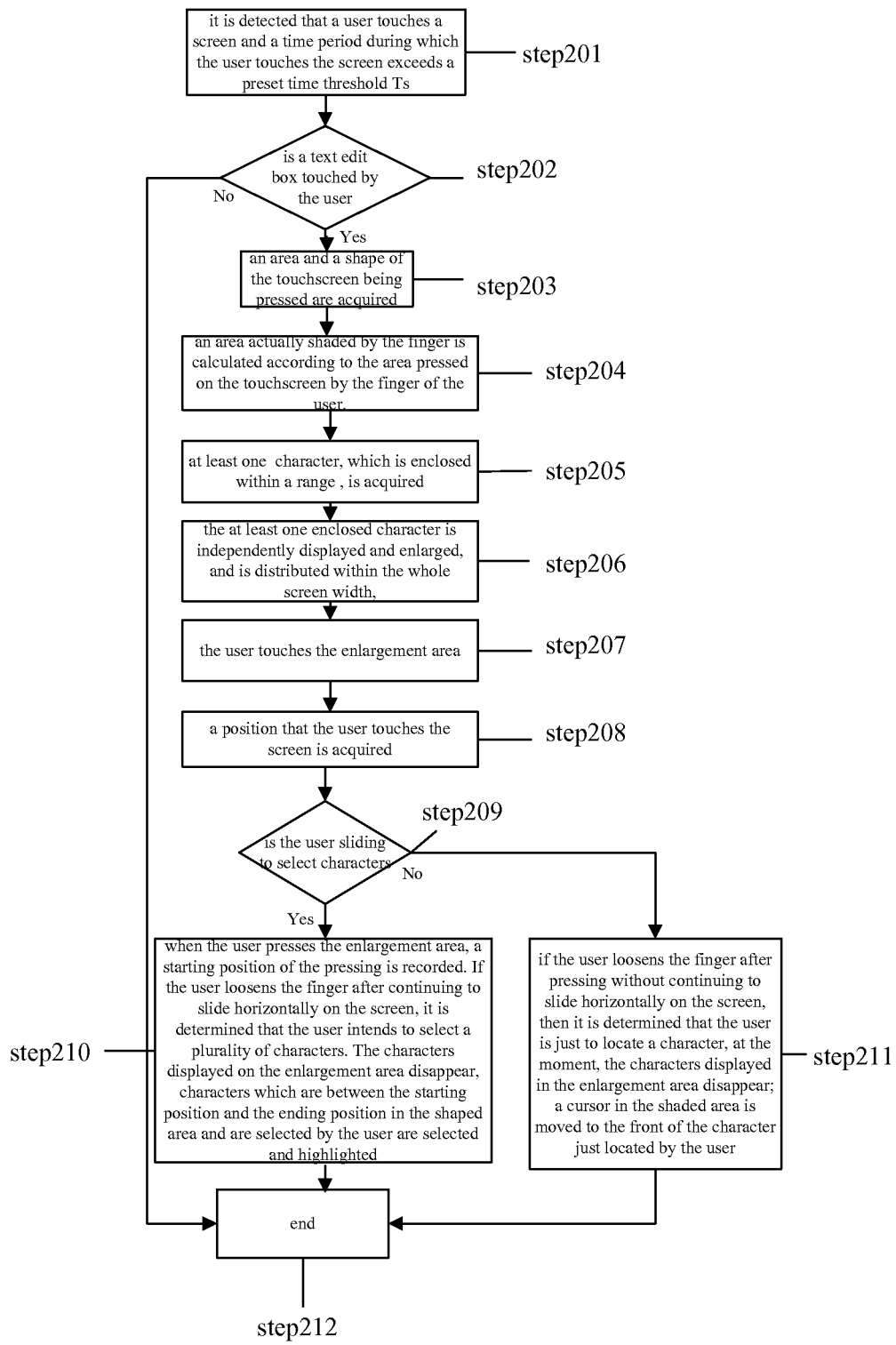
FIG. 2 is a flowchart of detailed processing of a method for displaying a character on a touchscreen according to an embodiment of the disclosure.
Figure 3:
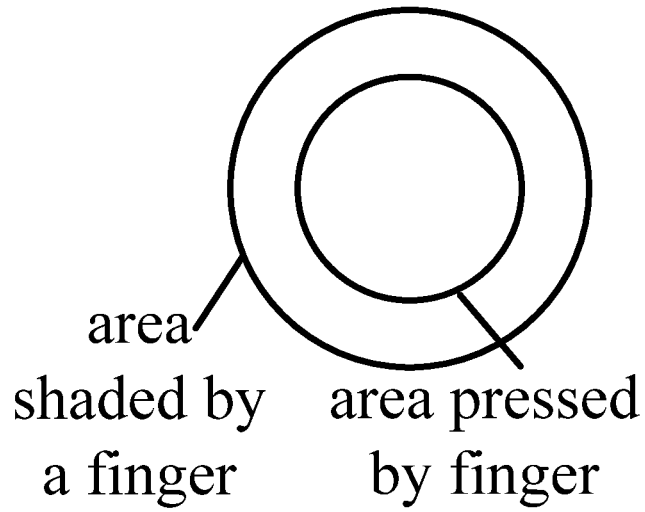
FIG. 3 is a schematic diagram of a pressed area and an actual shaded area when a finger touches a screen according to an embodiment of the disclosure.
Figure 4:
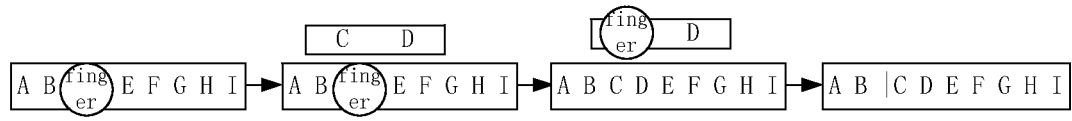
FIG. 4 is a schematic diagram of locating a character of according to an embodiment of the disclosure.

FIG. 2 is a flowchart of detailed processing of a method for displaying a character on a touchscreen according to an embodiment of the disclosure, as shown in FIG. 2, and the method specifically comprises the following steps:

step 201, it is detected that a user touches a screen and a time period during which the user touches an area exceeds a preset time threshold Ts;

step 202, it is detected by the terminal whether the area touched by the user comprises a character; if yes, turn to step 203; otherwise, turn to step 212;

step 203, an area and a shape of the touchscreen being pressed are acquired;

step 204, an area actually shaded by the finger is calculated according to the area pressed on the touchscreen by the finger of the user. For example, an approximate circle area in FIG. 3 may be used; in FIG. 3, $R_r = R_t + d_r$, where $R_t$ is the maximum radius of the area which is actually touched and pressed by the user and is detected by the touchscreen, and $d_r$ is a set predicted value, then an area shaded by the finger may be calculated through the above-mentioned formula;

step 205, horizontal characters, which are enclosed within a range taking $R_r$ as the radius, is acquired; and step 206, the enclosed horizontal characters are independently displayed and enlarged. As shown in FIG. 4, these characters are evenly distributed within the whole screen width, and the characters and intervals between the characters are obvious enough.

Figure 5:
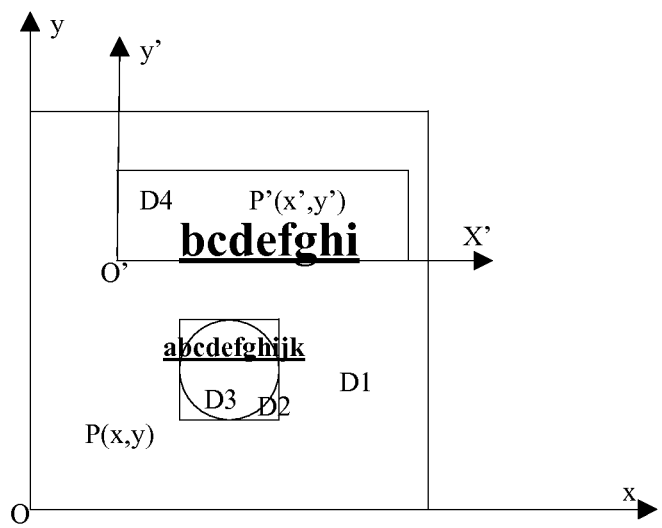
FIG. 5 is a schematic diagram of a screen area definition and coordinate rotation according to an embodiment of the disclosure.

Specifically, in step 206, coordinate systems should be defined firstly; as shown FIG. 5, the coordinate systems of the original screen and the enlargement screen are respectively set as XOY and X'O'Y'. D1, D2, D3 and D4 areas are respectively defined. Meaning of each area and the coordinate system for each area are as shown in table 1 as follows:

TABLE 1

| Area | Coordinate System | Meaning |
|---|---|---|
| D1 | XOY | the whole mobile phone screen |
| D2 | XOY | an outline rectangle area shaped by a finger when the finger presses the touchscreen |
| D3 | XOY | an area pressed by a finger |

TABLE 1-continued

| Area | Coordinate System | Meaning |
|---|---|---|
| D4 | X'O'Y' | enlargement highlighting display area |

In order to satisfy the flexibility of enlarging and displaying the characters, extension and translation relationships are exist between the two coordinate systems. The specific conversion steps of the transition relation are as follows:

assuming a coordinate value of O' in the XOY coordinate system is $(x_0, y_0)$, the length and width of area D2 are respectively a and b, and the length and width of D4 are respectively a' and b'. Then M and N are defined which are respectively ratio of the length in D4 to that in D2 and ratio of the width in D4 to that in D2, and the ratios are as follows: M=a'/a and N=b'/b.

Therefore, it can be derived that the transition relation between any point (x, y) in the XOY and any point (x', y') in the X'O'Y' are as follows: $x' = (x - x_0) * M$ and $$y' = (y - y_0) * N.$$

Figure 6:
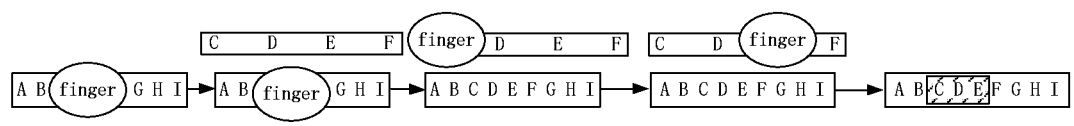
FIG. 6 is a schematic diagram of selecting characters according to an embodiment of the disclosure.
Figure 8:
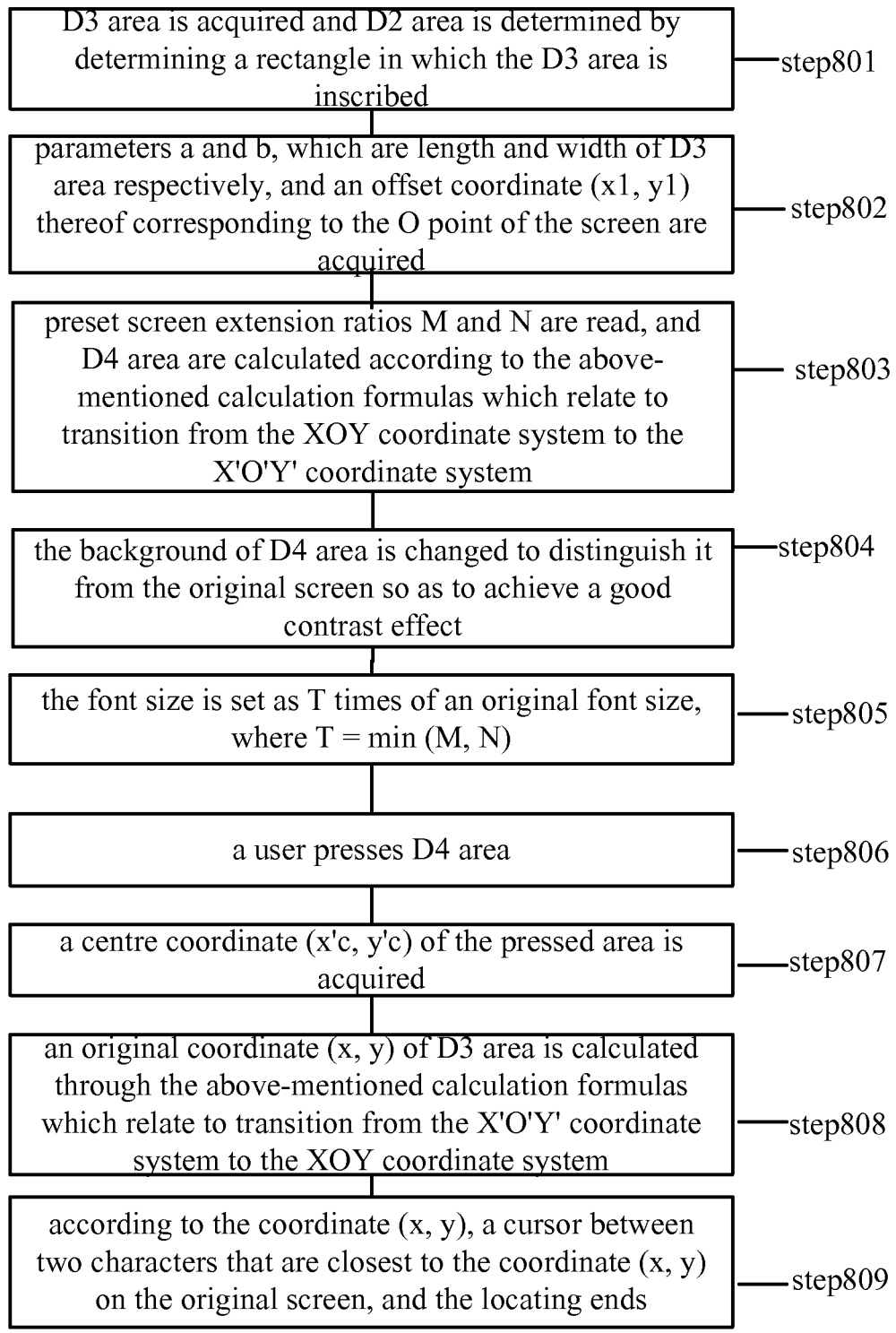
FIG. 8 is a flowchart of detailed processing of locating a character according to an embodiment of the disclosure.

On the contrary, the transition relation between any point (x, y) in the X'O'Y' and any point (x', y') in the XOY are as follows:

$$x = \frac{x'}{M} + x_0, \quad y = \frac{y'}{M} + y_0;$$

step 207, the user touches the enlargement area;

step 208, a position that the user touches the screen is acquired;

step 209, it is detected whether the user is sliding to select characters; if yes, turn to step 210; otherwise, turn to step 211;

step 210, when the user presses the enlargement area, a starting position of the pressing is recorded. If the user loosens the finger after continuing to slide horizontally on the screen, it is determined that the user intends to select a plurality of characters; as shown in FIG. 6, an ending position that the sliding ends is recorded, at the moment, the characters displayed on the enlargement area disappear, characters which are between the starting position and the ending position in the shaded area and are selected by the user are selected and highlighted (see the shadow part shown in the figure). Detailed selection, processing and calculation steps are as shown in FIG. 7 and would be described in detail subsequently: performing step 212 continuously;

step 211, if the user loosens the finger after pressing without continuing to slide horizontally on the screen, then it is determined that the user is just to locate a 3o character, at the moment, the characters displayed in the enlargement area disappear; as shown in FIG. 4, a cursor in the shaded area is moved to the front of the character just located by the user. Detailed locating and processing steps are as shown in FIG. 8 and would be described in detail subsequently; and step 212, the operation is ended.

Figure 7:
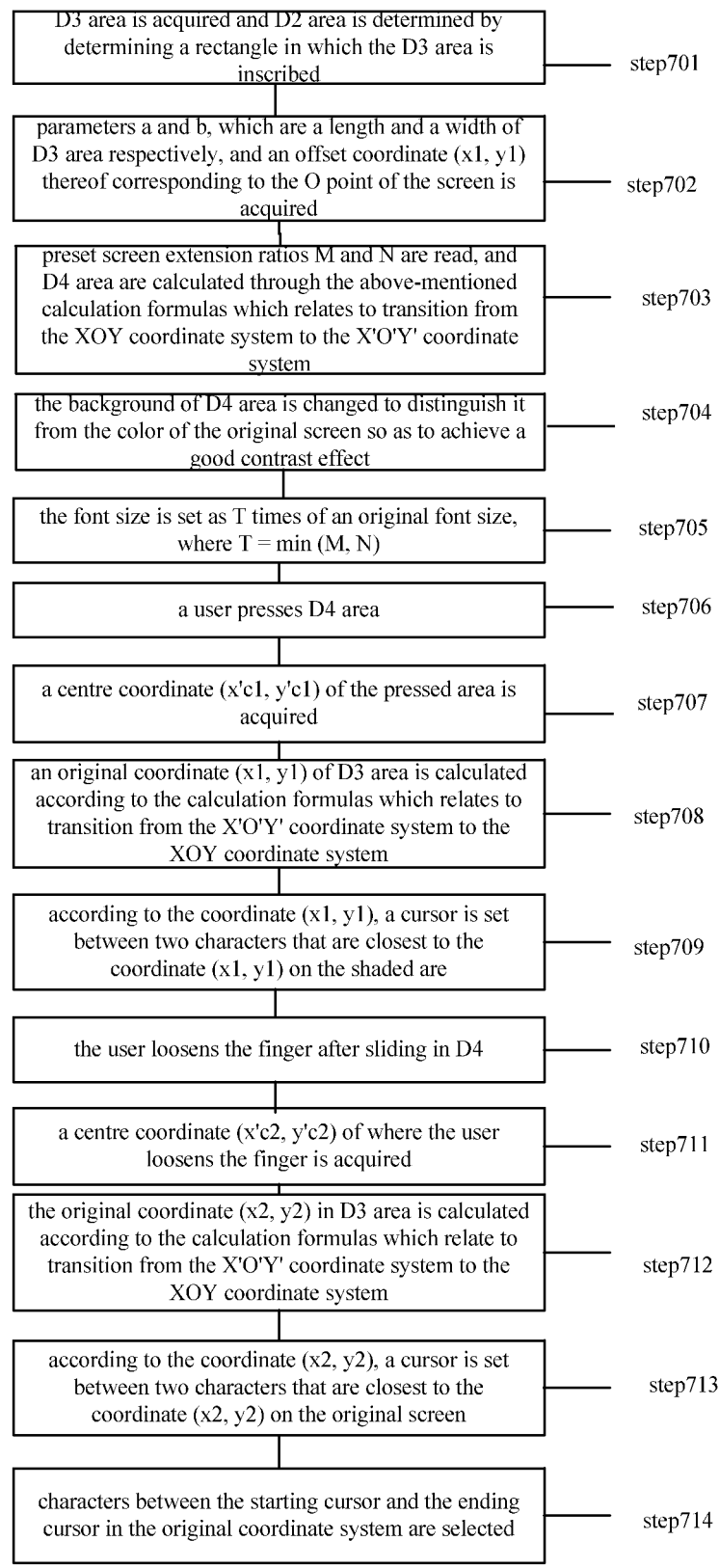
FIG. 7 is a flowchart of a detailed process for selecting characters according to an embodiment of the disclosure.

FIG. 7 is a flow chart of a detailed process for selecting characters according to an embodiment of the disclosure; and as shown in FIG. 7, the process for selecting characters according to the embodiment of the disclosure comprises the following processing:

step 701, D3 area is acquired and D2 area is determined by determining a rectangle in which the D3 area is inscribed;

step 702, parameters a and b, which are a length and a width of D3 area respectively, and an offset coordinate (x1, y1) thereof corresponding to the O point of the screen are acquired;

step 703, preset screen extension ratios M and N are read, and D4 area are calculated through the above-mentioned calculation formulas which relates to transition from the X'O'Y' coordinate system to the X'O'Y' coordinate system;

step 704, the background of D4 area is changed to distinguish it from the color of the original screen so as to achieve a good contrast effect;

step 705, the font size is set as T times of an original font size, where T=min (M, N);

step 706, a user presses D4 area;

step 707, a centre coordinate (x'c1, y'c1) of the pressed area is acquired;

step 708, an original coordinate (x1, y1) of D3 area is calculated according to the calculation formulas which relates to transition from the X'O'Y' coordinate system to the XOY coordinate system;

step 709, according to the coordinate (x1, y1), a cursor is set between two characters that are closest to the coordinate (x1, y1) on the shaded area;

step 710, the user loosens the finger after sliding in D4;

step 711, a centre coordinate (x'c2, y'c2) of where the user loosens the finger is acquired;

step 712, the original coordinate (x2, y2) in D3 area is calculated according to the calculation formulas which relate to transition from the X'O'Y' coordinate system to the XOY coordinate system;

step 713, according to the coordinate (x2, y2), a cursor is set between two characters that are closest to the coordinate (x2, y2) on the original screen; and step 714, characters between the starting cursor and the ending cursor in the original coordinate system are selected.

FIG. 8 is a flow chart of a detailed process for locating character according to an embodiment of the disclosure; and as shown in FIG. 8, the process for locating character according to the embodiment of the disclosure specifically comprises the following steps:

step 801, D3 area is acquired and D2 area is determined by determining a rectangle in which the D3 area is inscribed;

step 802, parameters a and b, which are length and width of D3 area respectively, and an offset coordinate (x1, y1) thereof corresponding to the O point of the screen are acquired;

step 803, the preset screen extension ratios M and N are read, and D4 area are calculated according to the above-mentioned calculation formulas which relate to transition from the XOY coordinate system to the X'O'Y' coordinate system;

step 804, the background of D4 area is changed to distinguish it from the original screen so as to achieve a good contrast effect;

step 805, the font size is set as T times of an original font size, where T=min (M, N);

step 806, a user presses D4 area;

step 807, a centre coordinate (x'c, y'c) of the pressed area is acquired;

step 808, an original coordinate (x, y) of D3 area is calculated through the above-mentioned calculation formulas which relate to transition from the X'O'Y' coordinate system to the XOY coordinate system; and step 809, according to the coordinate (x, y), a cursor between two characters that are closest to the coordinate (x, y) on the original screen, and the locating ends.

To sum up, by means of the technical solution of the embodiments of the disclosure, by independently displaying and enlarging the at least one shaded character in the shaded area on a preset enlargement area on the touchscreen, and locating or selecting the character by detecting the operation of the user on the preset enlargement area, the problem in related art that characters are not located or selected inaccurately when performing touchscreen input on the terminal is solved, and the success rate can be improved when a user selects and locates a character in the respect of web page browsing, web page content selection and text file content selection, thereby breaking the bottleneck of the accuracy of a smart phone for locating and selecting a character. Moreover, without specially increasing hardware costs, all the technical solutions of the embodiments of the disclosure can be realized by means of components of a product itself through simple software modifications.

Device Embodiments

Figure 9:
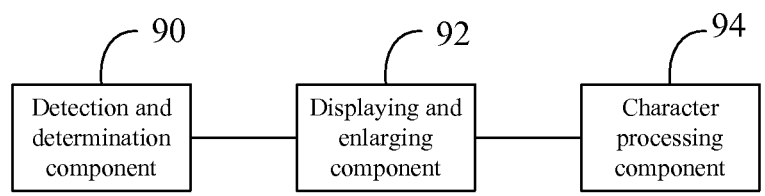
FIG. 9 is a structure diagram of a device for displaying a character on a touchscreen according to an embodiment of the disclosure.

According to an embodiment of the disclosure, a device for displaying a character on a touchscreen is provided; FIG. 9 is a structural schematic diagram of a device for displaying a character on a touchscreen according to an embodiment of the disclosure; and as shown in FIG. 9, the device for displaying the character on the touchscreen according to the embodiment of the disclosure comprises: a detection and determination component 90, a displaying and enlarging component 92 and a character processing component 94. Each component of the embodiment of the disclosure is hereinafter described in detail.

The detection and determination component 90 is configured to, when it is detected that a time period during which the user touches an area, where at least one character is displayed, on the touchscreen exceeds a preset time threshold, determine a shaded area formed when the user touches the touchscreen; specifically, the detection and determination component 90 is specifically configured to:

determine a radius $R_r$ of the shaded area according to formula 1;

$$R_r = R_t + d_r \quad \text{formula 1;}$$

where $R_r$ is the maximum radius of an area which is actually touched and pressed by the user and is detected by the touchscreen, and $d_r$ is a preset predicted value;

and determine the shaded area according to the radius $R_r$.

The displaying and enlarging component 92 is configured to acquire at least one shaded character in the shaded area, and independently display and enlarge the at least shaded character in a preset enlargement area excluding the shaded area on the touchscreen;

a coordinate system where the whole touchscreen display area locates is an XOY coordinate system, and a coordinate system where the preset enlargement area locates is an X'O'Y' coordinate system, wherein the coordinate value of O' point in the XOY coordinate system is $(x_0, y_0)$; in the XOY coordinate system, the display area of the whole touchscreen display area is D1 area, the shaded area in the D1 area is D3 area, and a rectangle taking the D3 area as an inscribed circle is D2 area; and in the X'O'Y' coordinate system, the preset enlargement area is D4 area;

the displaying and enlarging component 92 is configured to:

detect the D3 area, determine the D2 area according to the D3 area, and acquire the length a and the width b of the D2 area;

acquire preset screen extension ratios M and N, where $M=a'/a$, $N=b'/b$, a' is the length of the D4 area, and b' is the width of the D4 area;

determine a transition relation between a point (x, y) in the D2 area in the XOY coordinate system and a point (x', y') in the D4 area in the X'O'Y' coordinate system according to formula 2 and formula 3;

$$x'=(x-x_0)*M \quad \text{formula 2;}$$

$$y'=(y-y_0)*N \quad \text{formula 3;}$$

determine the D4 area according to the transition relation;

and acquire at least one shaded character in the shaded area and display the at least one shaded character in the D4 area, and set the font size of the D4 area as T times of an original character size, where T=min (M, N).

A character processing component 94 is configured to detect a touch of the user on the preset enlargement area, and perform locating and/or selecting on the at least one shaded character in the shaded area according to the detected touch.

specifically, the above-mentioned character processing component 94 specifically comprises:

a detection and judgment component configured to, when it is detected that the user touches the preset enlargement area, record a starting position of the preset enlargement area touched by the user and detect whether the user continuously performs slide touch on the preset enlargement area; if no, call a character positioning component; and if yes, call a character selection component.

The character positioning component is configured to calculate a corresponding starting position of the shaded area according to the starting position of the preset enlargement area and move a cursor to the front of a character corresponding to the starting position of the shaded area, wherein the starting position of the shaded area is in the shaded area.

Specifically, the character positioning component is specifically configured to:

acquire a centre coordinate $(x_c', y_c')$ of a starting position of the D4 area touched by the user, and calculate an original coordinate $(x_c, y_c)$ corresponding to the centre coordinate $(x_c', y_c')$ in the shaded area according to formula 4 and formula 5:

$$x_c=x_c'/M+x_0 \quad \text{formula 4;}$$

$$y_c=y_c'/N+y_0 \quad \text{formula 5;}$$

set a cursor between two characters which are closest to the original coordinate $(x_c, y_c)$.

The character selection component is configured to record an ending position of the preset enlargement area touched by the user and calculate corresponding starting position of the shaded area and ending position of the shaded area, which are in the shaded area, according to the starting position of the preset enlargement area and the ending position of the preset enlargement area, and select corresponding characters between the starting position of the shaded area and the ending position of the shaded area.

The character selection component is specifically configured to:

acquire a centre coordinate $(x_{c1}', y_{c1}')$ of a starting position of the D4 area touched by the user, and calculate an original coordinate $(x_{c1}, y_{c1})$ corresponding to the centre coordinate $(x_{c1}', y_{c1}')$ in the shaded area according to formula 6 and formula 7:

$$x_{c1}=x_{c1}'/M+x_0 \quad \text{formula 6;}$$

$$y_{c1}=y_{c1}'/N+y_0 \quad \text{formula 7;}$$

set the starting cursor between two characters which are closest to the original coordinate $(x_{c1}, y_{c1})$;

after it is detected that the sliding of the user in the D4 area ends, acquire a centre coordinate $(x_{c2}', y_{c2}')$ of an ending position of the D4 area touched by the user, and calculate an original coordinate $(x_{c2}, y_{c2})$ corresponding to the centre coordinate $(x_{c2}', y_{c2}')$ in the shaded area according to formula 8 and formula 9:

$$x_{c2}=x_{c2}'/M+x_0 \quad \text{formula 8;}$$

$$y_{c2}=y_{c2}'/N+y_0 \quad \text{formula 9;}$$

set the ending cursor between two characters which are closest to the original coordinate $(x_{c2}, y_{c2})$;

and select characters between the starting cursor and the ending cursor in the XOY coordinate system.

The detailed content of the above-mentioned processing of the embodiments of the disclosure can be understood with reference to corresponding descriptions of the method embodiments and is not repeatedly described here.

To sum up, by means of the technical solution of the embodiments of the disclosure, by independently displaying and enlarging the shaded character in the shaded area on a preset enlargement area on the touchscreen and locating or selecting the character by detecting the operation of the user on the preset enlargement area, the problem in related art that character are located or selected inaccurately when performing touchscreen input on the terminal is solved, and the success rate can be improved when a user selects and locates a character in the respect of web page browsing, web page content selection and text file content selection, thereby breaking the bottleneck of the accuracy of a smart phone for locating and selecting a character. Moreover, without specially increasing hardware costs, all the technical solutions of the embodiments of the disclosure can be realized by means of components of a product itself through simple software modifications.

The algorithm and display provide herein are not inherently related to any particular computer, virtual system or other devices. Various general systems can also be used together with teachings based thereon. According to the above-mentioned description, a structure required for constructing such a system would be obvious. Moreover, the disclosure likewise does not aim at any particular programming language. It should be known that various programming languages can be used to realize the contents of the disclosure described herein, and the description made on the particular language is for disclosing the best implementation of the disclosure.

A large number of specific details are described in the specification provided herein. However, it can be understood that the embodiments of the disclosure can be practiced without these specific details. In some examples, well-known methods, structures, and techniques have not been shown in detail so as not to obscure the understanding of this specification.

Similarly, it should be understood that for the purpose of simplifying the disclosure and helping understanding one or more of the various inventive aspects, in the above-mentioned description of the exemplary embodiments of the disclosure, various features of the disclosure would be together grouped into a single embodiment, figure or a description thereof sometimes. However, the disclosed method should not be explained as reflecting the following intention, that is, the claimed disclosure requires more features than that expressly recited in each claim. More precisely, as that reflected in the following claims, in the aspect of the invention, the number of features thereof is less than all the features of a single embodiment disclosed above.

Therefore, claims following the specific implementations are explicitly incorporated into the specific implementations thereby, wherein each claim stand on its own as a separate embodiment of the disclosure.

Those skilled in the art could understand that adaptability changes can be performed on components in a device in the embodiments, and same can be set in one or more devices which is differs from the embodiment. Components or units or components in the embodiments can be combined into one component or unit or component; in addition, same can be divided into a plurality of sub-components or sub-units or sub-components. Except for that at least some of such features and/or processes or units are mutually exclusive, any combination can be used to combine all the features disclosed in the present specification (including the accompanying claims, abstract and figures) and all the processes or units of any method or device disclosed in such a fashion. Unless explicitly noted otherwise, each feature disclosed in the specification (including the accompanying claims, abstract and figures) can be substituted by alternative features providing the same, equal or similar purposes.

Moreover, a person skilled in the art could understand that although some embodiments stated herein comprise certain features rather than other features included in other embodiments, a combination of features of different embodiments means within the scope of the disclosure and forming different embodiments. For example, in the following claims, any one of the claimed embodiments can be used in any combination.

Each component embodiment of the disclosure can be realized by hardware, or by a software component operated on one or more processors, or by a combination thereof. A person skilled in the art should understand that a microprocessor or a digital signal processor (DSP) can be used in practice to realize some or all of the functions of some or all of the components in an device displaying a character on a touchscreen according to the embodiments of the disclosure. The disclosure can also be realized as a device or an device program (for example, a computer program and a computer program product) for executing part of or all of the method described herein. Such a program for realizing the disclosure can be stored on a computer readable medium, or can be in the form of one or more signals. Such a signal can be downloaded from an Internet website, or be provided on a carrier signal, or be provided in any other form.

It should be noted that the above-mentioned embodiments are illustrative of the disclosure and not restrictive on the disclosure, and a person skilled in the art can design alternative embodiments without departing from the scope of the appended claims. In the claims, any reference symbols between parentheses should not be constructed as limiting the claims. The word "containing" does not exclude the existence of elements or steps which are not listed in the claims. The word "a" or "an" located before an element does not exclude the existence of a plurality of such elements. The disclosure can be realized by means of hardware comprising several different elements and by means of an appropriately programmed computer. In unit claims listing several devices, several of these devices can be specifically realized through the same hardware item. The use of words the first, the second, the third, etc. does not represent any order. These words can be interpreted as names.

What is claimed is:

1. A method for displaying a character on a touchscreen, comprising:

when it is detected that a time period during which the user touches an area, where at least one character is displayed, on the touchscreen exceeds a preset time threshold, determining a shaded area formed when the user touches the touchscreen;

acquiring at least one shaded character in the shaded area, and independently displaying and enlarging the at least one shaded character on a preset enlargement area excluding the shaded area on the touchscreen; and detecting a touch of the user on the preset enlargement area, and performing locating and/or selecting on the at least one shaded character in the shaded area according to the detected touch;

wherein detecting the touch of the user on the preset enlargement area, and performing locating and/or selecting on the at least one shaded character in the shaded area according to the detected touch comprises:

when it is detected that the user touches the preset enlargement area, recording a starting position of the preset enlargement area touched by the user and detecting whether the user continuously performs a slide touch on the preset enlargement area; if no, calculating a corresponding starting position of the shaded area according to the starting position of the preset enlargement area and moving a cursor to a front of a character corresponding to the starting position of the shaded area, wherein the starting position of the shaded area is in the shaded area; and if yes, recording an ending position of the preset enlargement area touched by the user and calculating corresponding starting position of the shaded area and ending position of the shaded area, which are in the shaded area, according to the starting position of the preset enlargement area and the ending position of the preset enlargement area, and selecting corresponding characters between the starting position of the shaded area and the ending position of the shaded area.

2. The method as claimed in claim 1, wherein when it is detected that the time period during which the user touches an area, where no character is displayed, on the touchscreen exceeds the preset time threshold, or when it is detected that the time period during which the user touches the touchscreen does not exceed the preset time threshold, an operation of the user is not responded.

3. The method as claimed in claim 1, wherein determining the shaded area formed when the user touches the touchscreen comprises:

determining a radius $R_r$ of the shaded area according to formula 1:

$$R_r = R_t + d_r \qquad \text{formula 1;}$$

where $R_t$ is the maximum radius of an area which is actually touched and pressed by the user and is detected by the touchscreen, and $d_r$ is a preset predicted value; and determining the shaded area according to the radius $R_r$.

4. The method as claimed in claim 1, wherein a coordinate system for the whole touchscreen display area is an XOY coordinate system, a coordinate system for the preset enlargement area is an X'O'Y' coordinate system, wherein a coordinate value of O' point in the XOY coordinate system is $(X_0, Y_0)$; in the XOY coordinate system, a display area of the whole touchscreen display area is D1 area, the shaded area in the D1 area is D3 area, and a rectangle taking the D3 area as an inscribed circle is D2 area; and in the X'O'Y' coordinate system, the preset enlargement area is D4 area;

acquiring the at least one shaded character in the shaded area, and independently displaying and enlarging the at least one shaded character on the preset enlargement area excluding the shaded area on the touchscreen specifically comprise:

detecting the D3 area, determining the D2 area according to the D3 area, and acquiring a length a and a width b of the D2 area;

acquiring preset screen extension ratios M and N, where M=a'/a, N=b'/b, a' is a length of the D4 area, and b' is a width of the D4 area;

determining a transition relation between a point (x, y) in the D2 area in the XOY coordinate system and a point (x', y') in the D4 area in the X'O'Y' coordinate system according to formula 2 and formula 3;

$$x'=(x-x_0)*M \quad \text{formula 2;}$$

$$y'=(y-y_0)*N \quad \text{formula 3;}$$

determining the D4 area according to the transition relation; and acquiring the at least one shaded character in the shaded area and displaying the at least one shaded character in the D4 area, and setting a font size of the D4 area as T times of an original character size, where T=min (M, N).

5. The method as claimed in claim 4, wherein the coordinate system for the whole touchscreen display area is the XOY coordinate system, and the coordinate system for the preset enlargement area is the X'O'Y' coordinate system, wherein a coordinate value of the O' point in the XOY coordinate system is $(X_0, Y_0)$; in the XOY coordinate system, the display area of the whole touchscreen display area is D1 area, the shaded area in the D1 area is D3 area, and a rectangle taking the D3 area as the inscribed circle is D2 area; and in the X'O'Y' coordinate system, the preset enlargement area is D4 area;

calculating a corresponding starting position of the shaded area in the shaded area according to the starting position of the preset enlargement area and moving the cursor to the front of the character corresponding to the starting position of the shaded area comprises:

acquiring a centre coordinate $(x_c', y_c')$ of the starting position of the D4 area touched by the user, and calculating an original coordinate $(x_c, y_c)$, which is corresponding to the centre coordinate $(x_c', y_c')$ and is in the shaded area, according to formula 4 and formula 5:

$$x_c=x_c'/M+x_0 \quad \text{formula 4;}$$

$$y_c=y_c'/N+y_0 \quad \text{formula 5;}$$

setting the cursor between two characters which are closest to the original coordinate $(x_c, y_c)$;

recording the ending position of the preset enlargement area touched by the user and calculating a corresponding starting position of the shaded area and ending position of the shaded area which are in the shaded area according to the starting position of the preset enlargement area and the ending position of the preset enlargement area, and selecting the corresponding characters between the starting position of the shaded area and the ending position of the shaded area comprises:

acquiring a centre coordinate $(x_{c1}', y_{c1}')$ of a starting position of the D4 area touched by the user, and calculating an original coordinate $(x_{c1}, y_{c1})$ corresponding to the centre coordinate $(x_{c1}', y_{c1}')$ in the shaded area according to formula 6 and formula 7:

$$x_{c1}=x_{c1}'/M+X_0 \quad \text{formula 6;}$$

$$y_{c1}=y_{c1}'/N+y_0 \quad \text{formula 7;}$$

setting a starting cursor between two characters which are closest to the original coordinate $(x_{c1}, y_{c1})$;

after it is detected that the sliding of the user in the D4 area ends, acquiring a centre coordinate $(x_{c2}', y_{c2}')$ of an ending position of the D4 area touched by the user, and calculating an original coordinate $(x_{c2}, y_{c2})$ corresponding to the centre coordinate $(x_{c2}', y_{c2}')$ in the shaded area according to formula 8 and formula 9:

$$x_{c2}=x_{c2}'/M+X_0 \quad \text{formula 8;}$$

$$y_{c2}=y_{c2}'/N+y_0 \quad \text{formula 9;}$$

setting an ending cursor between two characters which are closest to the original coordinate $(x_{c2}, y_{c2})$; and selecting characters between the starting cursor and the ending cursor in the XOY coordinate system.

6. A device for displaying a character on a touchscreen, comprising a hardware processor configured to execute program modules stored in a memory, the program modules comprising:

a detection and determination component configured to, when it is detected that a time period during which the user touches an area, where at least one character is displayed, on the touchscreen exceeds a preset time threshold, determine a shaded area formed when the user touches the touchscreen;

a displaying and enlarging component configured to acquire at least one shaded character in the shaded area, and independently display and enlarge the at least one character on a preset enlargement area excluding the shaded area on the touchscreen; and a character processing component configured to detect a touch of the user on the preset enlargement area, and perform locating and/or selecting on the at least one character in the shaded area according to the detected touch;

wherein the character processing component comprises: a detection and judgment component configured to, when it is detected that the user touches the preset enlargement area, record a starting position of the preset enlargement area touched by the user and detect whether the user continuously performs a slide touch on the preset enlargement area; if no, call the character positioning component; and if yes, call the character selection component; the character positioning component configured to calculate a corresponding starting position of the shaded area according to the starting position of the preset enlargement area and moving a cursor to a front of a character corresponding to the starting position of the shaded area, wherein the starting position of the shaded area is in the shaded area and the character selection component configured to record an ending position of the preset enlargement area touched by the user and calculate corresponding starting position of the shaded area and ending position of the shaded area which are in the shaded area according to the starting position of the preset enlargement area and the ending position of the preset enlargement area, and select corresponding characters between the starting position of the shaded area and the ending position of the shaded area.

7. The device as claimed in claim 6, wherein the detection and determination component is configured to:

determine a radius $R_r$ of the shaded area according to formula 1;

$$R_r=R_t+d_r \quad \text{formula 1;}$$

where $R_t$ is the maximum radius of an area which is actually touched and pressed by the user and is detected by the touchscreen, and $d_r$ is a preset predicted value; and determine the shaded area according to the radius $R_r$.

8. The device as claimed in claim 6, wherein a coordinate system for the whole touchscreen display area is an XOY coordinate system, a coordinate system for the preset enlargement area is an X'O'Y' coordinate system, wherein a coordinate value of O' point in the XOY coordinate system is $(X_0, Y_0)$; in the XOY coordinate system, a display area of the whole touchscreen display area is D1 area, the shaded area in the D1 area is D3 area, and a rectangle taking the D3 area as the inscribed circle is D2 area; and in the X'O'Y' coordinate system, the preset enlargement area is D4 area;

the displaying and enlarging component is configured to:
detect the D3 area, determine the D2 area according to the D3 area, and acquire a length a and a width b of the D2 area;

acquire preset screen extension ratios M and N, where M=a'/a, N=b'/b, a' is a length of the D4 area, and b' is a width of the D4 area;

determine a transition relation between a point (x, y) in the D2 area in the XOY coordinate system and a point (x', y') in the D4 area in the X'O'Y' coordinate system according to formula 2 and formula 3;

$$x'=(x-x_0)*M \qquad \text{formula 2};$$

$$y'=(y-y_0)*N \qquad \text{formula 3};$$

determine the D4 area according to the transition relation; and acquire the at least one shaded character in the shaded area and displaying the at least one shaded character in the D4 area, and set a font size of the D4 area as T times of an original character size, where T=min (M, N);

the character positioning component is configured to:
acquire a centre coordinate $(x_c', y_c')$ of the starting position of the D4 area touched by the user, and calculate an original coordinate $(x_c, y_c)$, which is corresponding to the centre coordinate $(x_c', y_c')$ and is in the shaded area, according to formula 4 and formula 5:

$$x_c=x_c'/M+x_0 \qquad \text{formula 4};$$

$$y_c=y_c'/N+y_0 \qquad \text{formula 5};$$

set the cursor between two characters which are closest to the original coordinate $(x_c, y_c)$; and the character selection component is configured to:
acquire a centre coordinate $(x_{c1}', y_{c1}')$ of the starting position of the D4 area touched by the user, and calculate an original coordinate $(x_{c1}, y_{c1})$, which is corresponding to the centre coordinate $(x_{c1}', y_{c1}')$ and is in the shaded area, according to formula 6 and formula 7:

$$x_{c1}=x_{c1}'/M+X_0 \qquad \text{formula 6};$$

$$y_{c1}=y_{c1}'/N+y_0 \qquad \text{formula 7};$$

set a starting cursor between two characters which are closest to the original coordinate $(x_{c1}, y_{c1})$;

after it is detected that the sliding of the user in the D4 area ends, acquire a centre coordinate $(x_{c2}', y_{c2}')$ of an ending position of the D4 area touched by the user, and calculate an original coordinate $(x_{c2}, y_{c2})$ corresponding to the centre coordinate $(x_{c2}', y_{c2}')$ in the shaded area according to formula 8 and formula 9:

$$x_{c2}=x_{c2}'/M+X_0 \qquad \text{formula 8};$$

$$y_{c2}=y_{c2}'/N+y_0 \qquad \text{formula 9};$$

set an ending cursor between two characters which are closest to the original coordinate $(x_{c2}, y_{c2})$; and select characters between the starting cursor and the ending cursor in the XOY coordinate system.

* * * * *